May 3, 1966   C. B. ROGERS   3,249,241
AIR-IN-FLOOR BALL CHECK VALVE
Filed Nov. 1, 1963

INVENTOR
CYRIL B. ROGERS
BY
ATTORNEYS

United States Patent Office 3,249,241
Patented May 3, 1966

3,249,241
AIR-IN-FLOOR BALL CHECK VALVE
Cyril B. Rogers, Battle Creek, Mich., assignor to Clark Equipment Company, a corporation of Michigan
Filed Nov. 1, 1963, Ser. No. 320,757
8 Claims. (Cl. 214—1)

My present invention relates generally to air valve assemblies and more particularly to air-in-floor ball check valve assemblies.

It is an object of my present invention to provide an air check valve device wherein tension spring means is employed to normally bias a valve member into engagement with the sealing surface of a support member.

It is another object of my present invention to provide an air check valve device comprising an annular support member which is compressible radially inwardly during insertion into an aperture in a wall whereby the same is snapped into a locked position in the wall.

It is a further object of my present invention to provide an air check valve assembly, as described, which is adapted to be incorporated in a material handling system wherein air under pressure is provided in a series of ducts and check valves in a floor so that a loaded pallet or the like positioned on the floor will actuate the check valves and effect release of pressurized air thereby causing the load to be floated on a thin film of air whereby a heavy load may be moved across the floor with a minimum of effort.

It is a still further object of my present invention to provide an air check valve device, as described, which is adapted to be installed in the floor of an air-in-floor system from the top surface of the floor by simply snapping the valve assembly into position in a suitable opening provided in the floor for such purpose.

It is still another object of my present invention to provide an air check valve device, as described, which is comprised of a minimum number of parts that may be easily and inexpensively manufactured and assembled, which may be conveniently and quickly installed in a floor, and which requires minimum maintenance.

In accomplishing the foregoing objects, I provide a valve member comprising an annular support member having an interior annular sealing surface and a valve member engageable with the sealing surface. The valve member is wider than the support member in the direction of the operating axis of the valve device, and is disposed so that it will project above the plane of the top surface of the support member when engaged against the sealing surface. Tension spring means, which at its upper end is secured in the support member and at its lower end abuts the valve member, serves to bias the valve member into engagement with the sealing surface. In accordance with my invention, the support member is formed of a yieldable material whereby the support member is compressible radially inwardly during insertion into the aperture in a floor so that the same is snapped into a locked position in the floor with the top surface of the support member lying substantially in the plane of the top surface of the floor. The valve member is actuatable by a loaded pallet being moved across the floor for releasing pressurized air from ducts beneath the top floor surface to thereby form a thin film between the floor surface and the bottom of the pallet so as to facilitate movement of the loaded pallet. A material handling system of the type in which the air check valve device of my present invention may be incorporated is disclosed and claimed in the copending application of Johnny T. Watters, Serial No. 320,884, filed November 1, 1963.

Now in order to acquaint those skilled in the art with the manner of constructing and using devices in accordance with the principles of my present invention, I shall describe in connection with the accompanying drawing, a preferred embodiment of my invention.

Figure 1:
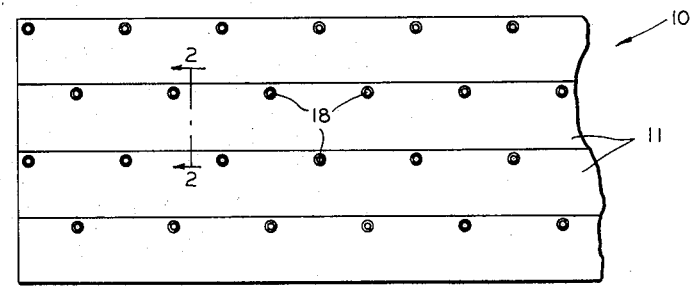
FIGURE 1 is a fragmentary plan view of part of a floor used in an air-in-floor material handling system.

Referring now to FIGURE 1, there is indicated generally by the reference numeral 10 a portion of a floor serving as part of an air-in-floor material handling system. The floor 10 may be incorporated in stationary installations, such as warehouses, or in movable equipment, such as trailers, railroad cars, and the like. For a complete description of the construction and operation of one type of air-in-floor material handling system, reference may be had to the copending application of Johnny T. Watters, Serial No. 320,884, filed November 1, 1963.

Figure 2:
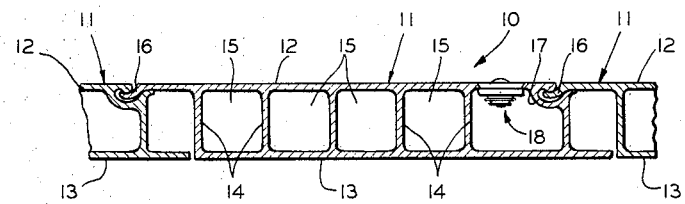
FIGURE 2 is a fragmentary sectional view, on an enlarged scale, taken substantially along the line 2—2 in FIGURE 1 looking in the direction indicated by the arrows, and illustrates the plurality of air ducts formed in each of the plurality of plank members which comprise the floor of FIGURE 1.

The floor 10 is comprised of a plurality of longitudinally extending floor planks 11 which are arranged side-by-side in interlocking relationship. As shown in FIGURE 2, each plank 11 comprises a top wall 12, a bottom wall 13, and a plurality of transversely spaced vertical divider walls 14 which define a plurality of longitudinally extending ducts or channels 15. Each of the planks 11 along one longitudinal side edge is formed with a male interlocking member 16 and along the other longitudinal side edge with a female interlocking member 17.

A plurality of air check valve devices 18 are installed at various preselected locations in the top wall 12 of the floor planks 11. When a loaded pallet or the like is positioned on the floor 10, and air under pressure is directed through the ducts 15, the loaded pallet will actuate the check valves 18 and effect release of pressurized air. This action causes the pallet and load to be floated on a thin film of air whereby a heavy load may be moved across the floor with a minimum of effort. Disclosed in the aforesaid copending application of Johnny T. Watters are details concerning the general manner in which air under pressure is selectively introduced into the ducts 15, and the specific manner in which a portion of the floor 10 may be selectively pressurized without pressurizing the entire floor.

Figure 3:
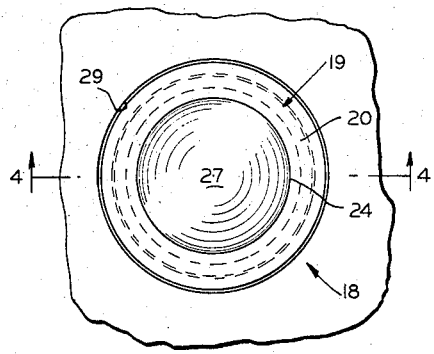
FIGURE 3 is a fragmentary plan view, on a further enlarged scale, of a portion of the floor of FIGURE 1, and illustrates an air check valve device embodying the principles of my present invention.
Figure 4:
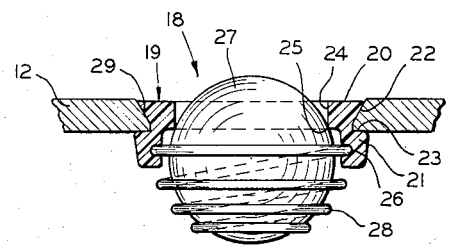
FIGURE 4 is a fragmentary vertical sectional view of the air valve device of FIGURE 3, taken substantially along the line 4—4 in FIGURE 3, looking in the direction indicated by the arrows.

As shown in FIGURES 3 and 4, each air check valve assembly 18 comprises an annular support member 19 having an annular collar portion 20 and a depending annular flange portion 21. The collar portion 20 has an inverted truncated conical exterior surface 22 that merges with the flange portion 21 in a manner defining an annular horizontal shoulder portion 23. The collar portion 20 also has a cylindrical inner surface 24 which along its lowermost edge serves to define an annular sealing surface or valve seat 25. Formed in the flange portion 21 is a radially inwardly facing annular groove 26 that is adapted to receive spring means as will be presently described. The support member 19 is fabricated of a yieldable or plastic material such as nylon so that it may be compressed radially inwardly for insertion into an opening adapted to hold the same, and the configuration of the support member 19 is such that it may be inexpensively manufactured in one piece by injection molding procedures. Associated with the support member 19 is a valve member 27, preferably in the form of a chrome steel or stainless steel sphere or ball, which is arranged to engage the valve seat 25 for closing the opening in the collar portion 20 defined by the cylindrical surface 24. To be noted is the compactness that results from the fact that the width of the support member 19 in the direction of the operating axis of the valve is less than the diameter of the ball valve 27. The ball valve 27 is normally biased into engagement with the valve seat 25 by spring means 28 preferably in the form of an inverted generally conical helical tension coil spring. The uppermost coil of the spring member 28 is received in and supported by the annular groove 26 in the flange portion 21, and the lowermost coil abuts the underside of the ball valve 27.

Each of the plank members 11 is provided with a plurality of countersunk openings 29 (one of which is shown in FIGURE 4) for accommodating the air check valve assemblies 18. The openings 29 are formed in the top walls 12 of the floor planks so as to communicate with the corresponding underlying air ducts 15. Each opening 29 has an inverted truncated conical inner surface that is arranged to receive and engage the external conical surface 22 of the collar portion 20 of a valve 18. A valve 18 may be installed in a plank opening 29 by urging the support member 19 downwardly until it snaps into the self-locking position shown in FIGURE 4. During installation, the flange portion 21 is compressed radially inwardly by the lower margin of the plank opening 29 until the shoulder portion 23 clears the opening and springs radially outwardly beneath the lower surface of the top plank wall 12. In the position shown in FIGURE 4, the valve support member 19 is locked firmly within the top plank wall 12, resists all forces tending to displace it, and can be removed only with great difficulty.

When a valve assembly 18 is properly installed in one of the floor plank openings 29, the valve support member 19 projects only a short distance into the corresponding air duct 15. The upper surface of the collar portion 20 of the support member 19 lies substantially in, but preferably slightly below, the plane of the top surface of the floor plank 11 as shown in FIGURE 4, and the ball valve member 27 projects above the top surface of the floor plank 11. When in this position, the ball valve 27 is adapted to be depressed by a loaded pallet positioned over the corresponding floor section whereby the valve 27 is moved out of engagement with the valve seat 25 and air under pressure is released through the valve from the duct 15. Such air serves to form a thin film between the bottom of the pallet and the top surface of the floor thus lifting the pallet a very slight distance off of the floor. Thus, a heavy load may be moved across the floor with a minimum of effort due to the floating of the pallet and load on a thin film of air.

From the foregoing description, it will be readily appreciated that I have provided an air check valve device which may be easily and inexpensively manufactured, which may be easily and quickly installed in a floor from the top surface thereof, which is self-locking in position, and which requires minimum maintenance because of its simplicity of construction.

While I have shown and described what I believe to be a preferred embodiment of my present invention, it will be understood by those skilled in the art that various rearrangements and modifications may be made therein without departing from the spirit and scope of my invention.

I claim:

1. A valve device comprising a support member with a collar portion and a depending flange portion, said collar portion having an inverted truncated conical exterior surface that merges with said flange portion to define an annular horizontal shoulder portion, said collar portion having a cylindrical inner surface which along its lowermost edge serves to define an annular valve seat, a spherical valve member engageable with said valve seat, said support member having a width in the direction of the operating axis of the valve device less than the diameter of said valve member, tension spring means at its one end being supported in said flange portion and at its other end abutting the underside of said valve member for biasing the latter into engagement with said valve seat, and said support member being compressible radially inwardly for insertion into an opening adapted to hold the same.

2. For use with a member having a wall with at least one aperture formed therein, a valve device comprising a support member having an interior annular sealing surface, a valve member engageable with said sealing surface, tension spring means at its one end being supported in said support member and at its other end abutting said valve member for biasing the latter into engagement with said sealing surface, said support member being compressible radially inwardly during insertion into the aperture whereby the same is snapped into a locked position in the wall with the exterior surface of said support member lying substantially in the plane of the exterior surface of the wall, and said valve member being disposed so that it will project beyond the plane of the exterior surface of the wall when engaged against said sealing surface.

3. For use with a floor having at least one aperture formed therein, a valve device comprising a support member with a collar portion and a flange portion, said collar portion having an interior annular sealing surface, a spherical valve member engageable with said sealing surface, said support member having a width in the direction of the operating axis of the valve device less than the diameter of said valve member, tension spring means at its one end being supported in said flange portion and at its other end abutting said valve member for biasing the latter into engagement with said sealing surface, said support member being compressible radially inwardly during insertion into the aperture whereby the same is snapped into a locked position in the wall with the top surface of said collar portion lying substantially in the plane of the top surface of the floor, and said valve member being disposed so that it will project above the plane of the top surface of the floor when engaged against said sealing surface.

4. For use with a hollow floor plank having air duct means formed therein and having at least one aperture formed in its top wall, an air valve device comprising a support member having an interior annular sealing surface, a valve member engageable with said sealing surface, tension spring means at its one end being supported in said support member and at its other end abutting said valve member for biasing the latter into engagement with said sealing surface, said support member being compressible radially inwardly during insertion into the aperture whereby the same is snapped into a locked position in the floor plank, and said valve member being disposed so that it will project above the plane of the exterior surface of the top wall of the floor plank when engaged against said sealing surface.

5. For use in an air-in-floor system of the type where air under pressure is supplied to air valves mounted in a floor for providing a thin film of air between the floor and a load, the improvement comprising, in combination, a hollow floor plank having air duct means formed therein and having a plurality of apertures formed in its top wall, a plurality of air valves one for insertion in each of said apertures, each of said air valves including a support member which is compressible radially inwardly during insertion into the aperture whereby the same is snapped into a locked position in said plank, said support member having an interior annular sealing surface, a valve member urged upwardly against said sealing surface by tension spring means suspended from said support member, and said valve member being disposed so that it will project above the plane of the exterior surface of the top wall of said floor plank when engaged against said sealing surface.

6. A valve device comprising a support member having an interior annular sealing surface, a valve member engageable about its upper side with said sealing surface, tension spring means encircling the lower portion of said valve member, and said spring means at its one end being supported interiorly within said support member adjacent said annular sealing surface and at its other end abutting the underside of said valve member for biasing the latter into engagement with said sealing surface.

7. The valve device of claim 6 wherein said support member is of lesser width than said valve member in the direction of the operating axis of the valve device.

8. A valve device comprising a support member with a collar portion and a flange portion, said collar portion having an interior annular sealing surface, a spherical valve member engageable about its upper side with said sealing surface, said support member having a width in the direction of the operating axis of the valve device less than the diameter of said valve member, tension spring means encircling the lower portion of said valve member, and said spring means at its one end being supported interiorly within said flange portion adjacent said annular sealing surface and at its other end abutting the underside of said valve member for biasing the latter into engagement with said sealing surface.

References Cited by the Examiner
UNITED STATES PATENTS 2,315,627 4/1943 Lamb.
2,584,716 2/1952 Koppel _____ 251—321 X
2,944,684 6/1960 Dennis.

MARVIN A. CHAMPION, *Primary Examiner.*